(12) United States Patent
Zhang

(10) Patent No.: US 10,100,699 B2
(45) Date of Patent: *Oct. 16, 2018

(54) EMISSION CONTROL SYSTEM AND REDUCTANT INJECTOR

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 91 days.

This patent is subject to a terminal disclaimer.

(21) Appl. No.: 15/234,706

(22) Filed: Aug. 11, 2016

(65) Prior Publication Data

US 2017/0292422 A1 Oct. 12, 2017

Related U.S. Application Data

(63) Continuation-in-part of application No. 15/092,270, filed on Apr. 6, 2016, now Pat. No. 9,708,956.

(51) Int. Cl.
*F01N 3/00* (2006.01)
*F01N 3/24* (2006.01)
*F01N 3/20* (2006.01)

(52) U.S. Cl.
CPC .......... *F01N 3/24* (2013.01); *F01N 3/208* (2013.01); *F01N 3/2066* (2013.01); *F01N 2610/02* (2013.01); *F01N 2610/10* (2013.01); *F01N 2610/1453* (2013.01); *F01N 2900/1404* (2013.01)

(58) Field of Classification Search
USPC ......... 60/274, 286, 287, 288, 289, 295, 297, 60/301, 303, 324
See application file for complete search history.

(56) References Cited

U.S. PATENT DOCUMENTS

| | | | |
|---|---|---|---|
| 5,992,141 A * | 11/1999 | Berriman | B01D 53/56 60/274 |
| 6,045,054 A | 4/2000 | Peterson, Jr. | |
| 6,526,746 B1 | 3/2003 | Wu | |
| 8,602,634 B2 * | 12/2013 | Matula | B01F 3/0865 239/416.4 |
| 8,978,364 B2 * | 3/2015 | Olivier | F01N 3/2066 239/124 |
| 9,598,999 B2 * | 3/2017 | De Rudder | F01N 3/00 |

(Continued)

FOREIGN PATENT DOCUMENTS

WO 2008079191 A1 7/2008

*Primary Examiner* — Binh Q Tran
(74) *Attorney, Agent, or Firm* — Julia Voutyras; McCoy Russell LLP

(57) ABSTRACT

An emission control system for an engine is described herein. The emission control system includes a reductant injector extending into an exhaust conduit upstream of a catalyst, the reductant injector including a reductant passage receiving reductant from a reductant reservoir and a first exhaust gas inlet receiving exhaust gas from the exhaust conduit, a boundary of the first exhaust gas inlet at least partially delineated by an inlet wall extending into an interior exhaust passage from an outer housing surface, the interior exhaust passage adjacent to the reductant passage and receiving exhaust gas from the first exhaust gas inlet and fluidly separated from the reductant passage.

20 Claims, 8 Drawing Sheets

(56) References Cited

U.S. PATENT DOCUMENTS

| | | | |
|---|---|---|---|
| 2002/0162322 A1* | 11/2002 | Ganzmann | B01D 53/79 60/286 |
| 2005/0224605 A1 | 10/2005 | Dingle | |
| 2008/0105441 A1 | 5/2008 | Metzger | |
| 2008/0282687 A1* | 11/2008 | Park | F01N 3/0253 60/300 |
| 2011/0258987 A1* | 10/2011 | Miebach | F01N 3/206 60/274 |
| 2012/0124983 A1 | 5/2012 | Hong | |
| 2013/0043330 A1 | 2/2013 | Corless | |

* cited by examiner

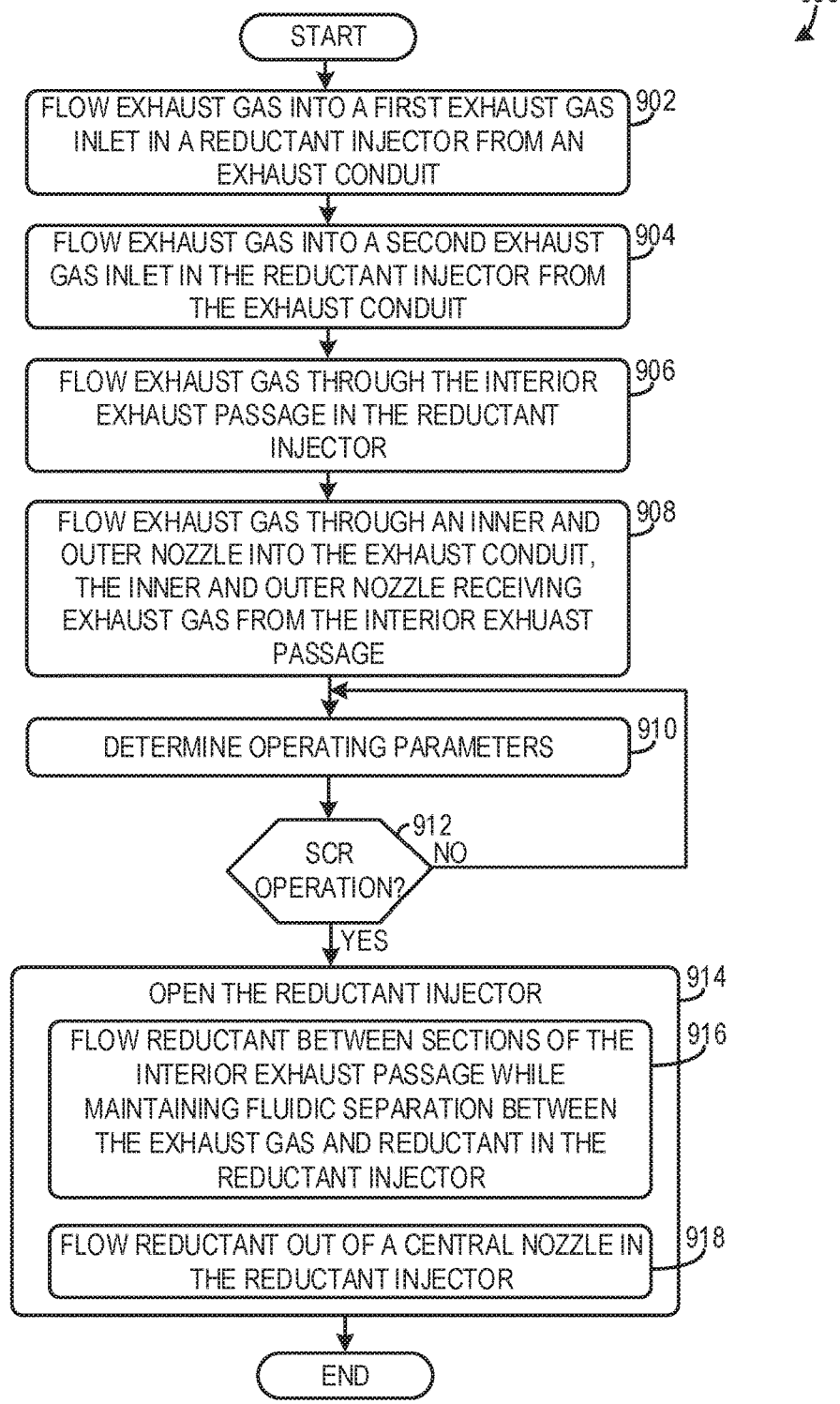

EMISSION CONTROL SYSTEM AND REDUCTANT INJECTOR

CROSS REFERENCE TO RELATED APPLICATION

The present application is a continuation-in-part of U.S. patent application Ser. No. 15/092,270, entitled "EMISSION CONTROL SYSTEM AND REDUCTANT INJECTOR," filed on Apr. 6, 2016, the entire contents of which are hereby incorporated by reference for all purposes.

BACKGROUND/SUMMARY

Engine may implement a strategy called selective catalytic reduction (SCR) to reduce engine emission in exhaust systems. SCR is a process where a gaseous or liquid reductant (e.g., ammonia, urea, etc.) is introduced into an exhaust conduit upstream of a catalyst. The SCR strategy converts $NO_x$ into $N_2$ and water in the exhaust stream, reducing engine emissions and therefore the engine's impact on the environment. However, a number of factors can impact SCR performance. For example, decreased reductant injection atomization, caused by low pressure reductant injection, can negatively affect SCR operation. Reduced reductant evaporation, during cold starts for example, can also decrease $NO_x$ conversion in the catalyst. Incomplete flow mixing of the reductant and the exhaust gas can also decrease $NO_x$ conversion in the catalyst. In previous emission control systems a mixing device, downstream of a reductant injector, may be provided to improve SCR performance. However, the mixing device may be costly, bulky, and increase exhaust backpressure. Furthermore, mixing devices do not significantly improve reductant atomization and evaporation in the exhaust system. Thus, mixing devices may not enable the SCR catalyst to achieve desirable $NO_x$ conversion levels.

To address at least some of the aforementioned problems, an emission control system in an engine is provided. The emission control system includes a reductant injector extending into an exhaust conduit upstream of a catalyst, the reductant injector including a reductant passage receiving reductant from a reductant reservoir and a first exhaust gas inlet receiving exhaust gas from the exhaust conduit, a boundary of the first exhaust gas inlet at least partially delineated by an inlet wall extending into an interior exhaust passage from an outer housing surface, the interior exhaust passage adjacent to the reductant passage and receiving exhaust gas from the first exhaust gas inlet and fluidly separated from the reductant passage. The inlet wall in the aforementioned reductant injector can increase turbulence (e.g., swirl) of the exhaust gas flowing through and exiting the injector. Increased exhaust gas turbulence in the injector can increase the amount of heat transferred from the exhaust gas to the reductant. Increased reductant temperature increases reductant vaporization once the reductant is injected. Resultingly, conversion in the downstream catalyst can be increased to reduce emissions. Additionally, increased exhaust gas turbulence within the injector can promote mixing of the reductant stream and the exhaust gas stream exiting the injector, further increasing catalyst conversion to reduce emissions. Arranging the inlet wall inwardly from the injector housing also enables the profile of the injector to be reduced to increase the injector's compactness. Increased reductant injector compactness enables exhaust gas back pressure in the exhaust system to be reduced and simplifies reductant injector installation during manufacturing.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 9 shows another method for operation of an emission controls system.

DETAILED DESCRIPTION

Figure 1:
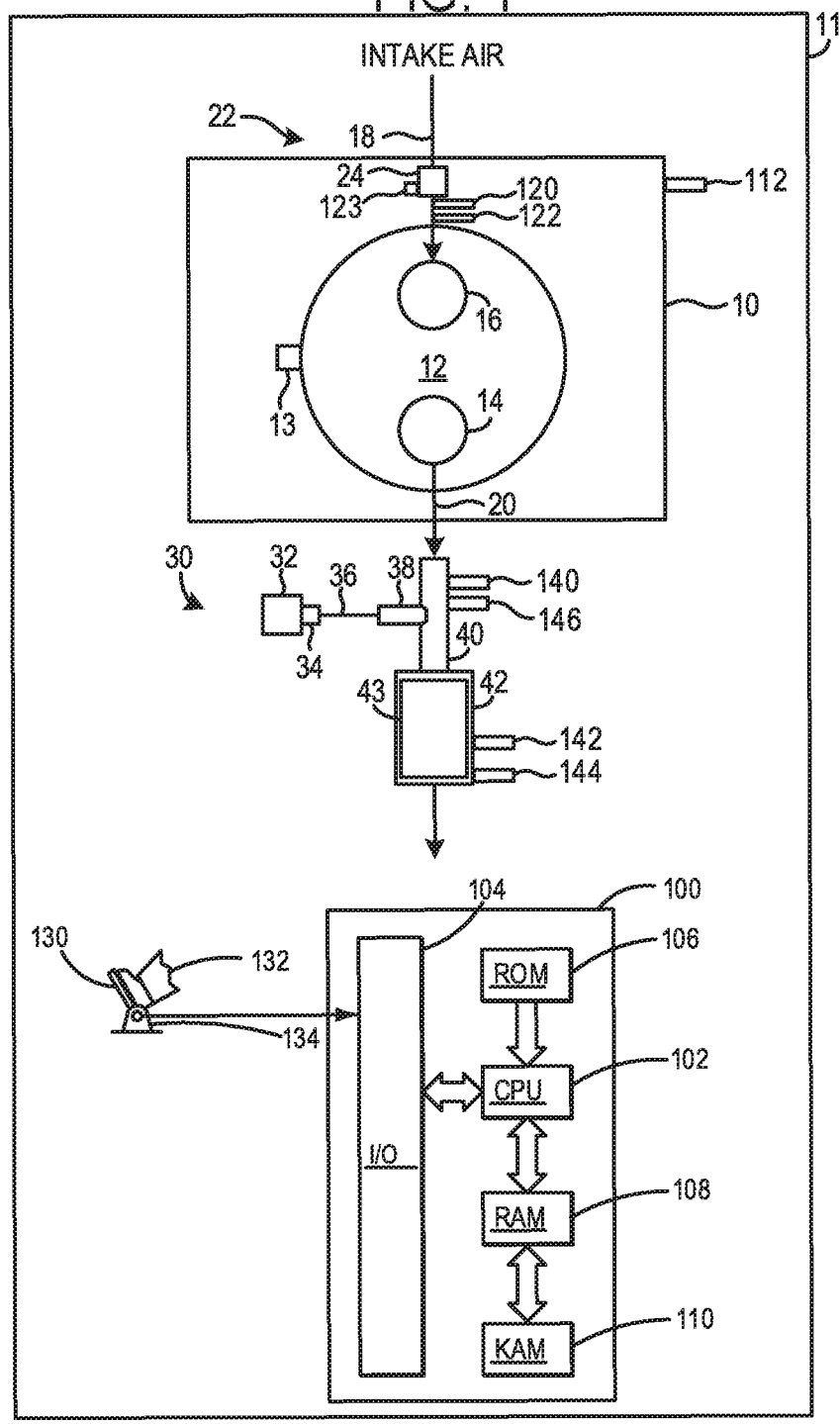
FIG. 1 shows a schematic depiction of an engine including an emission control system.
Figure 2:
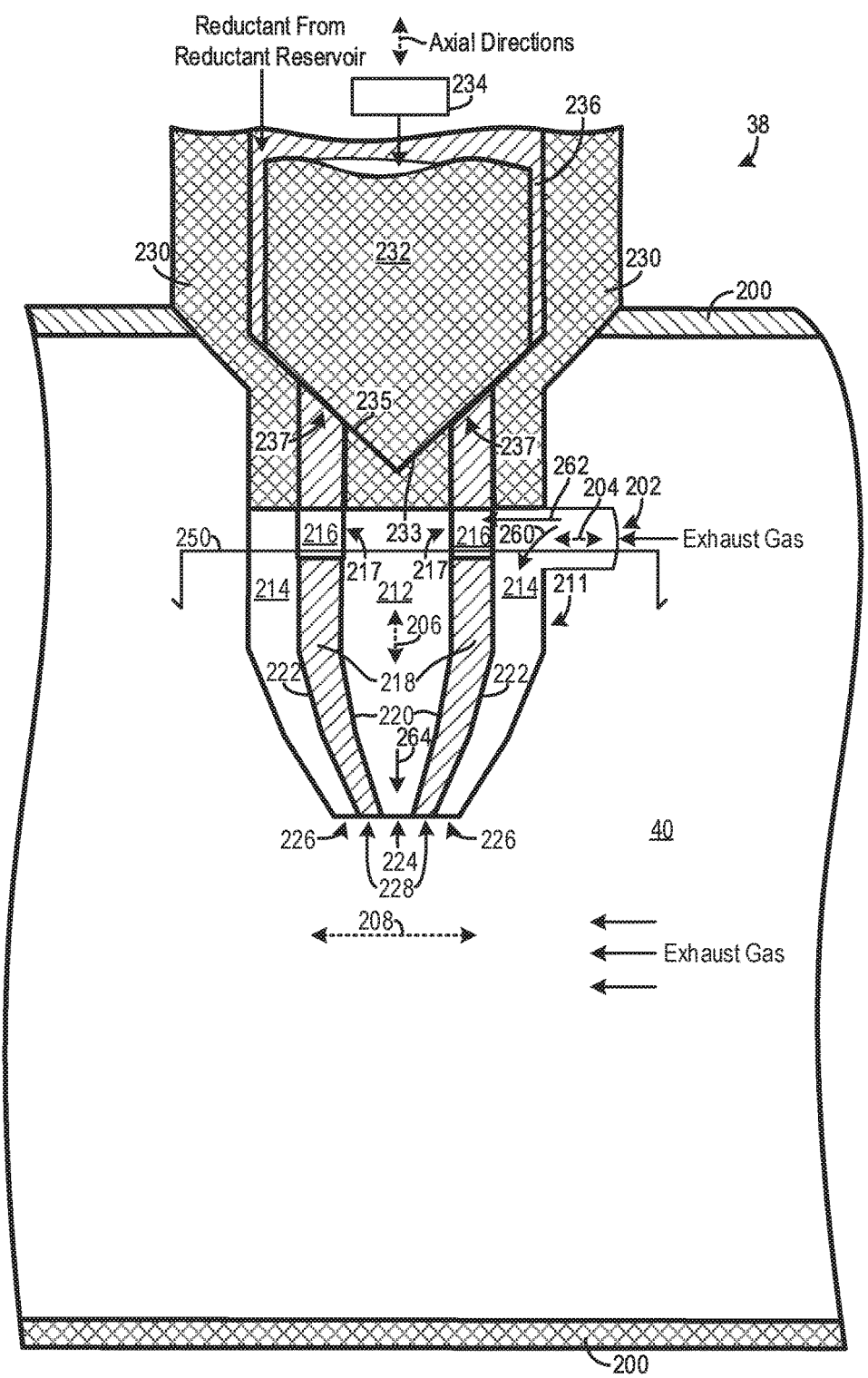
FIG. 2 shows an exemplary depiction of a reductant injector in the emission control system shown in FIG. 1 in a closed configuration.
Figure 3:
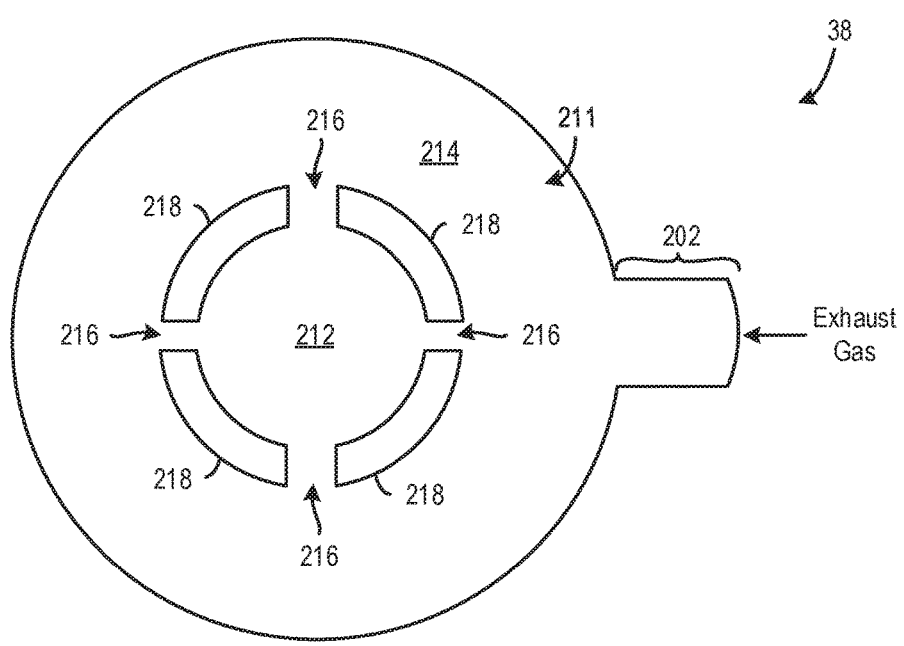
FIG. 3 shows a cross-sectional view of the reductant injector shown in FIG. 2.
Figure 4:
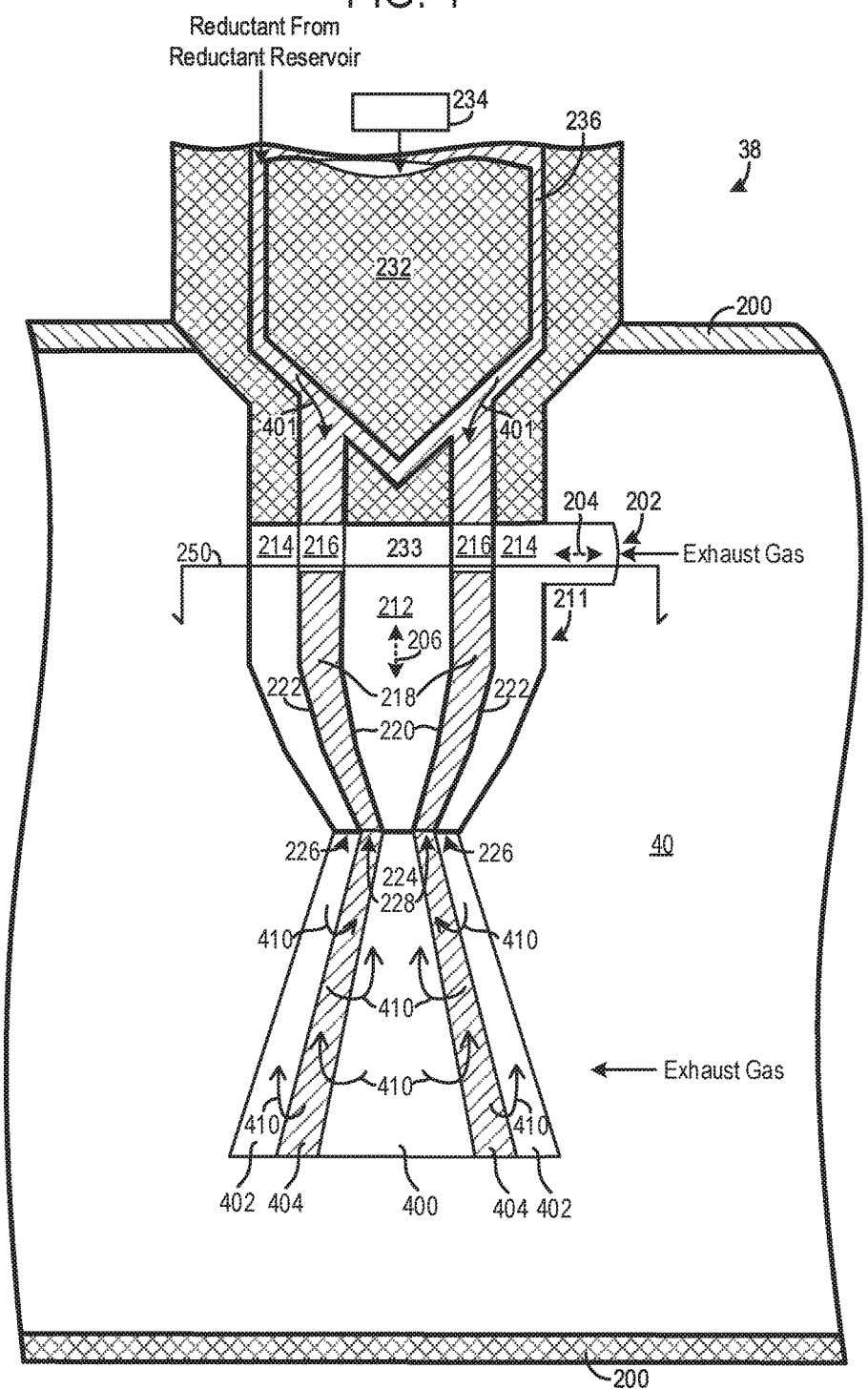
FIG. 4 shows a depiction of the reductant injector in FIG. 2 in an open configuration.
Figure 5:
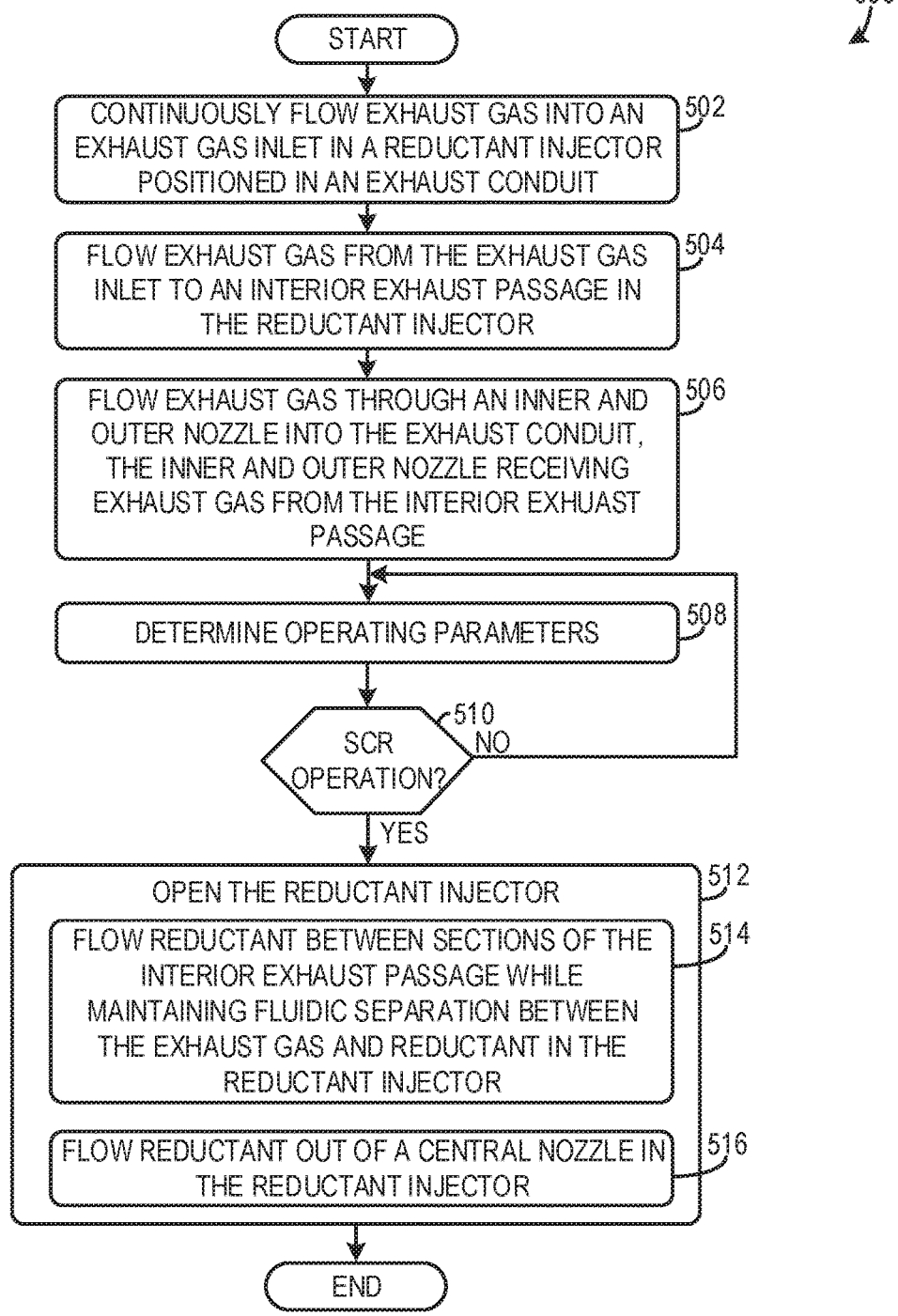
FIG. 5 shows a method for operation of an emission control system.
Figure 6:
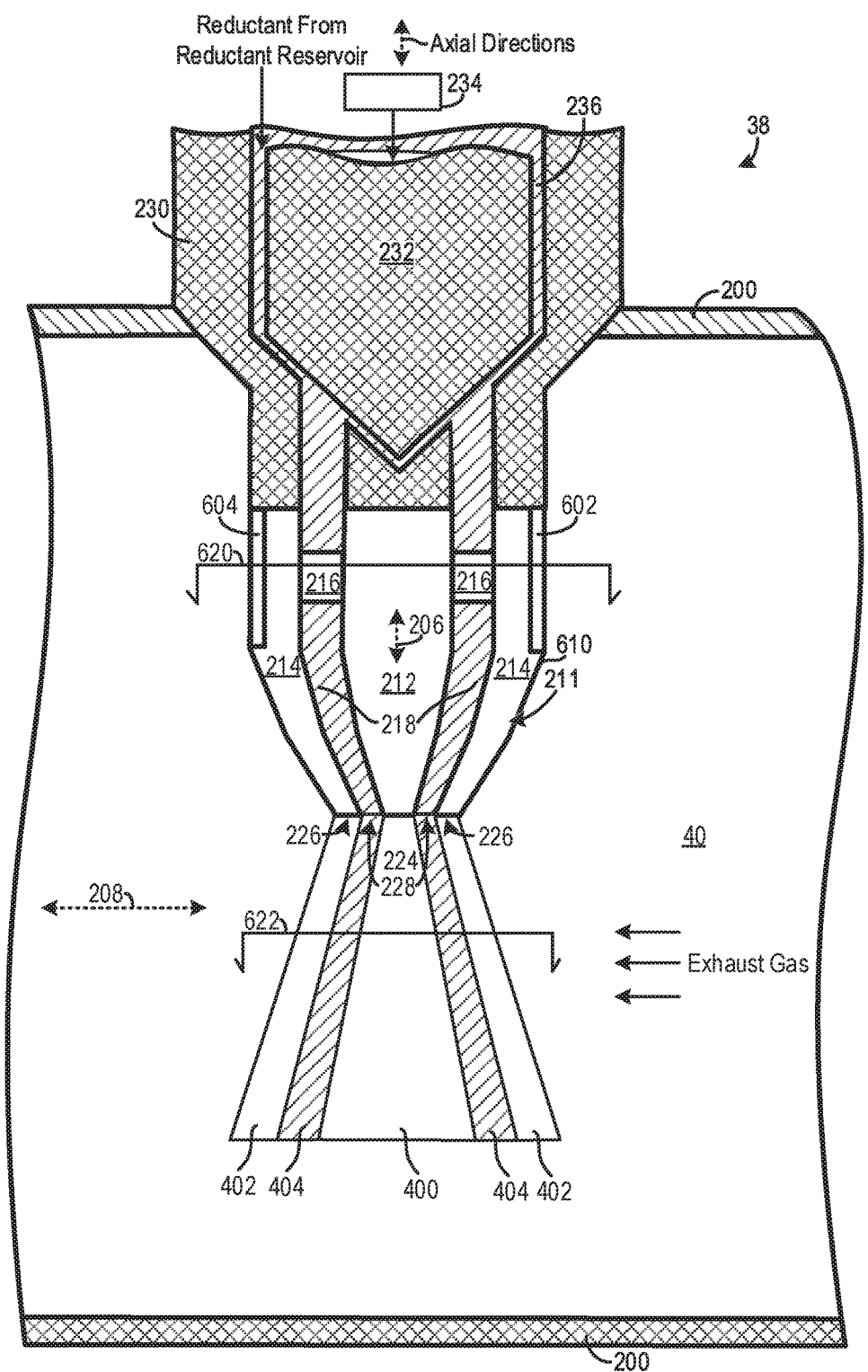
FIG. 6 shows another example depiction of a reductant injector included in the emission control system shown in FIG. 1 in an open configuration.
Figure 7:
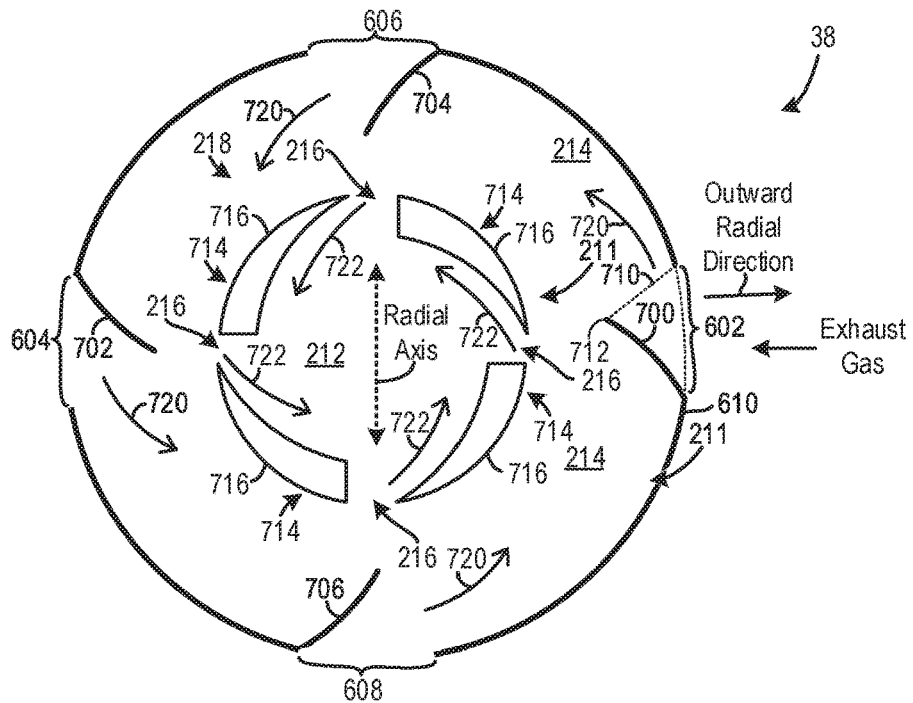
FIG. 7 shows a cross-section of the reductant injector shown in FIG. 6.
Figure 8:
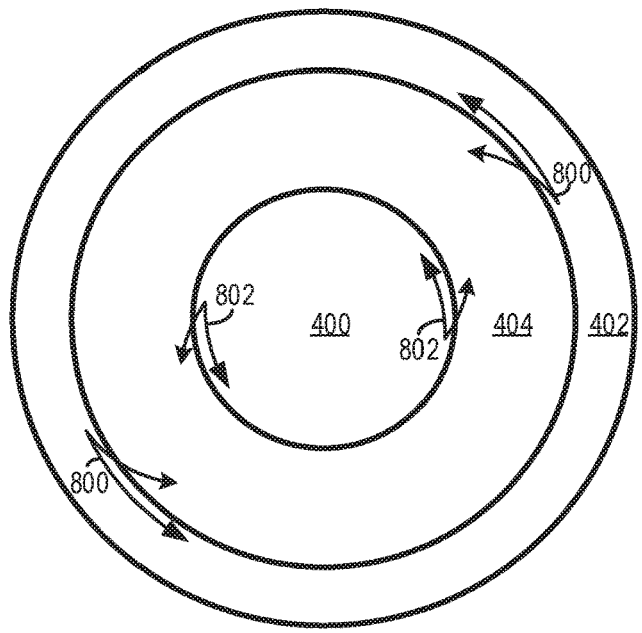
FIG. 8 shows another cross section of reductant injected from the reductant injector shown in FIG. 6.

An emission system with a reductant injector that promotes increased flow mixing, reductant atomization, and reductant vaporization is described herein. These benefits can be achieved by routing interior exhaust passages next to a reductant passage in the injector. Routing exhaust gas next to the reductant in the injector enables heat to be transferred from the exhaust gas to the reductant, thereby increasing reductant temperature. Increased reductant temperature increases reductant vaporization once the reductant is injected. Resultingly, conversion in the downstream catalyst can be increased to reduce emissions. Routing the exhaust gas next to the reductant can also promote flow mixing downstream of the injector nozzles, further improving catalyst operation. Furthermore, the reductant flowing from the reductant injector may have a high pressure. When a reductant stream with high pressure is injected adjacent to an exhaust gas stream traveling through the reductant injector, atomization of injected reductant is increased. Reductant atomization further increases conversion in the downstream catalyst. The reductant injector can also achieve improved reductant atomization and flow mixing of the exhaust gas and reductant through an exhaust gas inlet offset from an outer housing that extends into an interior of the injector. Arranging the exhaust gas inlet in this manner enables turbulence (e.g., swirl) of the exhaust gas flowing through the injector to be increased. The increased exhaust gas turbulence can enable an increased amount of heat to be transferred from the exhaust gas to the reductant in the injector, further increasing reductant atomization. Increased exhaust gas turbulence can also increase flow mixing of the reductant stream with the exhaust gas exiting the injector nozzles. Flow mixing can further increase conversion in the downstream catalyst. Additionally, arranging the reductant injector's exhaust gas inlet offset from the outer housing also enables the profile of the injector to be reduced, thereby increasing the injector's compactness. The increased injector compactness can reduce exhaust gas back pressure in the exhaust system and simplify injector installation during manufacturing. FIG. 1 shows a schematic depiction of an engine and emission control system, FIGS. 2-4 shows an exemplary reductant injector included in the emission control system in FIG. 1, and FIG. 5 shows a method for operation of a reductant injector in an emission control system. FIG. 6 shows another exemplary reductant injector that may be included in the emission control system shown in FIG. 1. FIG. 7 shows a cross-section of the reductant injector depicted in FIG. 6. FIG. 8 show a cross-section of the reductant stream generated by the reductant injector depicted in FIG. 6. FIG. 9 shows another method for operation of an emission control system.

FIG. 1 shows a schematic depiction of an internal combustion engine 10 in a vehicle 11 with at least one cylinder 12 and is controlled by an electronic engine controller 100. Engine 10 includes a cylinder 12 with a piston (not shown) positioned therein and connected to a crankshaft (not shown). A fuel injector 13 is shown coupled to the cylinder 12. Additionally or alternatively a port injector may be included in the engine 10. It will be appreciated that the fuel injector 13 receives fuel from a fuel delivery system (now shown) that may include a fuel tank, fuel pump, fuel rail, etc.

During operation, each cylinder within engine 10 typically undergoes a four-stroke cycle: the cycle includes an intake stroke, compression stroke, expansion stroke, and exhaust stroke. During the intake stroke, generally, an exhaust valve 14 closes and intake valve 16 opens. Air is introduced into the cylinder 12 via an intake conduit 18 (e.g., intake manifold), and the piston moves to the bottom of the cylinder to increase the volume within cylinder 12. The position at which piston is near the bottom of the cylinder and at the end of its stroke (e.g., when cylinder is at its largest volume) is typically referred to by those of skill in the art as bottom dead center (BDC). During the compression stroke, the intake valve 16 and the exhaust valve 14 are closed. The piston moves toward the cylinder head to compress the air within the cylinder 12. The point at which the piston is at the end of its stroke and closest to the cylinder head (e.g., when cylinder 12 is at its smallest volume) is typically referred to by those of skill in the art as top dead center (TDC). In a process hereinafter referred to as injection, fuel is introduced into the cylinder. In a process hereinafter referred to as ignition, the injected fuel is ignited by known ignition means such as a spark plug or compression, resulting in combustion. During the expansion stroke, the expanding gases push the piston back to BDC. The crankshaft converts piston movement into a rotational torque of the rotary shaft. Finally, during the exhaust stroke, the exhaust valve 14 opens to release the combusted air-fuel mixture to exhaust conduit 20 (e.g., exhaust manifold) and the piston returns to TDC. Note that the above is shown merely as an example, and that intake and exhaust valve opening and/or closing timings may vary, such as to provide positive or negative valve overlap, late intake valve closing, or various other examples. Further, the engine may be a compression ignition engine configured to operate with diesel fuel, for example, and thus during operation ignition via spark plug may be dispensed with.

An intake system 22 is provided in the engine 10 and configured to provide intake air to an intake valve 16 coupled to the cylinder 12. The intake system 22 includes a throttle 24 coupled to an intake conduit 18 providing intake air to the intake valve 16. The throttle 24 is configured to adjust the amount of intake air provided to the cylinder 12. Additional components may be included in the intake system 22, such as additional conduits, a compressor, an intake manifold, etc., that assist in providing intake air to the cylinder and/or provide other useful functions such as providing boost, cooling, etc. Further in one example, the intake system 22 can include the intake valve 16.

An emission control system 30 is also shown in FIG. 1. The emission control system 30 is configured to receive exhaust gas from the exhaust valve 14. The emission control system 30 includes a reductant reservoir 32 and a reductant pump 34. A reductant conduit 36 is positioned between the reductant pump 34 and a reductant injector 38 and enables reductant to flow therebetween. FIG. 1 schematically depicts the reductant injector 38. However, it will be appreciated that the reductant injector 38 may have additional features, functionality, complexity, etc., that is illustrated in greater detail herein. Furthermore, both the reductant conduit 36 and the reductant injector 38 can be included in the emission control system 30.

The reductant reservoir 32 is configured to hold reductant (e.g., urea, ammonia, etc.) which may be in a liquid form, in one example. Furthermore, the reductant reservoir 32 may also include a fill port enabling the reservoir to be refilled by a user. The reductant pump 34 is configured to convey reductant between the reductant reservoir 32 and the reductant injector 38. The reductant pump 34 may be designed to increase the pressure of the reductant above a desired level. In one example, one liquid urea pump can be used in the system may be designed to deliver injection pressure from 50 to 70 bar. In yet another example, the emission control system 30 may include a second reductant pump (e.g., higher pressure pump) to enable the reductant to reach a higher pressure level.

As shown, the reductant injector 38 is coupled to an exhaust conduit 40 upstream of a catalyst 42 (e.g., selective catalyst reduction (SCR) catalyst). It will be appreciated that the catalyst 42 as well as exhaust conduits 40 and/or 20 can also be included in the emission control system 30. The catalyst 42 may include a catalyst bed 43 configured to receive exhaust gas and reductant, during selected time intervals, and convert $NO_x$ into $N_2$, in one example. The catalyst bed 43 may include materials such as base-metal oxides, zeolites, and/or any other materials that enable $NO_x$ conversion in the catalyst. For instance, the catalyst bed 43 may include a honeycomb structure coated with zeolite. However, numerous suitable catalyst bed configurations have been contemplated.

In other examples, the emission control system 30 may include additional components such as additional catalyst(s) (e.g., oxidation catalyst), a filter (e.g., diesel particulate filter), a turbine, an exhaust gas recirculation branch, etc. These components may be positioned upstream/downstream of the catalyst 42 and/or reductant injector 38. The emission control system 30 may also include a valve positioned in the reductant conduit 36. The valve may be configured to adjust the amount of reductant flowing therethrough.

Controller 100 is shown in FIG. 1 as a conventional microcomputer including: microprocessor unit 102, input/output ports 104, read-only memory 106, random access memory 108, keep alive memory 110, and a conventional data bus. Controller 100 is shown receiving various signals from sensors coupled to engine 10, in addition to those signals previously discussed, including: engine coolant temperature (ECT) from temperature sensor 112 coupled to a cooling sleeve, for example; a position sensor 134 coupled to an accelerator pedal 130 for sensing force applied by foot 132; a measurement of engine manifold pressure (MAP) from pressure sensor 122 coupled to the intake conduit 18; an engine position sensor from a Hall effect sensor (not shown) sensing crankshaft position; a measurement of air mass entering the engine from sensor 120; and a measurement of throttle position from sensor 123. Barometric pressure may also be sensed (sensor not shown) for processing by controller 100. Controller 100 may also receive signals from sensors located in the emission control system 30 such as exhaust gas composition sensor 140, temperature sensor 142, catalyst bed sensor 144 configured to determine catalyst oxidation, and/or airflow sensor 146. The controller 100 may also be configured to trigger one or more actuators in the engine 10 and specifically the emission control system 30. For instance, the controller 100 may be configured to adjust the throttle 24, the reductant injector 38, fuel injector 13, reductant pump 34, etc. Specifically, the controller 100 may be configured to command the emission control system 30 and in particular the reductant injector 38 to perform SCR operation during selected time intervals. Therefore, the controller 100 receives signals from the various sensors of FIG. 1 and employs the various actuators of FIG. 1 to adjust engine operation based on the received signals and instructions stored on a memory of the controller.

FIGS. 2-4 show a detailed illustration of an exemplary reductant injector 38. Specifically, FIG. 2 shows the reductant injector in a closed configuration where reductant injection is inhibited and FIG. 4 shows the reductant injector in an open configuration where reductant injection is permitted. FIG. 3 shows a cross-section of the reductant injector illustrating the interior passages. The reductant injector 38 includes several features which enable increased reductant evaporation and atomization to be achieved in the emission control system 30, when comparted to previous emission control systems.

In FIG. 2 the reductant injector 38 is shown extending into exhaust conduit 40 through a conduit wall 200. It will be appreciated that the exhaust conduit 40 is upstream of the catalyst 42, shown in FIG. 1. The reductant injector 38 includes an exhaust gas inlet 202 receiving exhaust gas flow from the exhaust conduit 40. In this example, the exhaust gas that is routed internally in and through the injector is received at the prevailing exhaust pressure in the passage of the exhaust surrounding the exterior of the injector, as opposed to an external source of exhaust gas that may be at a different pressure than the exhaust into which the reductant is injected. In this way, the exhaust gas traveling through the injector may not be pressurized by a pump or other pressure-generating device, but rather the flow may be generated via the prevailing exhaust gas flow in the passage captured by the upstream facing inlet.

As illustrated, the exhaust gas inlet 202 (e.g., an axis 204 of the exhaust gas inlet 202) is perpendicular to a central axis 206 of the reductant injector 38. Additionally as illustrated in FIG. 2 the exhaust gas inlet 202 is parallel to a central axis 208 of the exhaust conduit 40. When the exhaust gas inlet 202 is arranged in this manner the flowrate of exhaust gas entering the reductant injector 38 can be increased. Increasing the amount of exhaust gas flowing through the reductant injector 38 enables the amount of reductant evaporation to be increased. Consequently, the conversion rate of $NO_x$ in the downstream catalyst 42, shown in FIG. 1, can be increased. However, other arrangements of the exhaust gas inlet 202 have been contemplated.

The reductant injector 38 includes an interior exhaust passage 211 having an inner section 212, outer section 214, and connection sections 216 fluidly connecting the inner section 212 and the outer section 214. It will be appreciated that exhaust gas may continuously flow through the exhaust gas inlet 202 and the interior exhaust passage 211 during combustion operation in the engine. However, in other examples a valve may be included in the reductant injector to regulate exhaust gas flowing therethrough. Arrow 260 indicates the general flow of exhaust gas from the exhaust gas inlet 202 to the outer section 214 of the interior exhaust passage 211. Arrow 262 indicates the general flow of exhaust gas from the exhaust gas inlet 202 to the connection section 216. Additionally, arrow 264 indicates the general flow of exhaust gas through the inner section 212 of the interior exhaust passage 211.

The connection sections 216 extend through a portion 217 of a reductant passage 218. Moreover, the interior exhaust passage 211 is adjacent to the reductant passage 218 and is fluidly separated from the reductant passage. In the depicted example, the inner section 212 and the outer section 214 of the interior exhaust passage 211 is concentrically arranged with the reductant passage 218. The concentric arrangement of the passages enables an increased amount of heat to be transferred from the exhaust gas to the reductant during reductant injection. Additionally, the concentric arrangement of the exhaust and reductant passages in the reductant injector enables the mixing of the reductant and the exhaust gas in the exhaust conduit 40 to be increased. As a result, the conversion of $NO_x$ in the downstream catalyst can be increased.

Additionally, the inner section 212 is surrounded (e.g., circumferentially enclosed) by the reductant passage 218. Moreover, the outer section 214 surrounds the reductant passage 218. However, in other examples the inner section 212 may only be partially surrounded by the reductant passage 218 and/or the outer section 214 may only partially surround the reductant passage 218.

Additionally in the depicted example, the inner section 212 shares a common wall 220 with the reductant passage 218. That is to say that the wall 220 divides (i.e., provides fluidic separation between) the inner section 212 and the reductant passage 218. Another common wall 222 separates the outer section 214 and the reductant passage 218. When the reductant passage and the interior exhaust passage share common walls an increased amount of heat can be transferred from the exhaust gas to the reductant during reductant injection. However other reductant injector configurations have been contemplated. For instance, injectors with multi-layer walls separating the exhaust passage and the reductant passage have been contemplated.

The reductant injector 38 further includes an inner nozzle 224 and an outer nozzle 226 each receiving exhaust gas flow from the interior exhaust passage 211. The reductant injector 38 also includes a central nozzle 228 selectively receiving reductant from the reductant passage 218 based on the configuration (i.e., open or closed configuration) of the reductant injector 38. It will be appreciated that the central nozzle 228 is fluidly separated from the inner and outer nozzles 224 and 226.

Additionally in the depicted example, the outer nozzle 226 and the central nozzle 228 extend toward the central axis 206 of the reductant injector 38. This nozzle arrangement can further promote flow mixing of the reductant an exhaust gas in the exhaust conduit 40 during reductant injection. However, other angular arrangements of the injector nozzles have been contemplated.

The reductant injector 38 also includes mounting boss 230 configured to attach the reductant injector 38 to the exhaust conduit wall 200. The reductant injector 38 also includes an injector needle 232 positioned within a reductant chamber 236. As illustrated, the reductant chamber 236 may be configured to receive reductant from the reductant reservoir 32 shown in FIG. 1. Therefore, reductant in the reductant chamber 236 may circumferentially surround the injector needle 232.

The injector needle 232 includes a downstream end 233. When the reductant injector 38 is in the closed configuration, depicted in FIG. 2, a portion of the downstream end 233 seats and seals on a surface 235 adjacent to an inlet 237 of the reductant passage 218. In this way, the injector needle 232 acts to prevent reductant flow into the reductant passage 218. Thus, the injector needle 232 extends across the inlet 237 of the reductant passage 218. The downstream end 233 tapers in an axial direction extending toward the injector nozzles and comes to a tip, in the illustrated example. However, numerous suitable geometries of the injector needle 232 enabling the needle to block the reductant passage 218 in a closed position have been contemplated.

The reductant injector 38 also include an actuator 234 configured to receive control signals from the controller 100 shown in FIG. 1. The control signals may command the actuator to move the injector needle 232 to open and close the reductant injector 38. Therefore, the injector needle 232 may be moved by the actuator 234 to enable reductant to flow from the reductant chamber 236 into the reductant passage 218. In the depicted example, the actuator 234 can move the injector needle 232 in axial directions to open and close the reductant injector 38. Further in one example, the actuator 234 may be directly coupled to the injector needle 232. In such an example, the actuator 234 may be a solenoid or other suitable actuation mechanism.

The reductant injector 38 depicted in FIG. 2 is in a closed configuration and therefore the injector needle 232 prevents reductant flow from the reductant chamber 236 to the reductant passage 218. In other examples, the actuator 234 may be configured to rotate the reductant injector to open and close the injector. Rotating the reductant injector 38 can enable backpressure to be reduced in the exhaust system when reductant injection is not occurring. In such an example, the exhaust gas inlet 202 may be aligned with (e.g., substantially parallel to) the central axis 208 of the exhaust conduit 40 when the reductant injector is open. That is to say that the exhaust gas inlet 202 may be aligned with the general direction of exhaust gas flow in the exhaust conduit 40 in the open configuration. On the other hand, in the closed configuration the exhaust gas inlet 202 may not be aligned with the central axis 208 of the exhaust conduit 40 when the reductant injector 38 is in the closed configuration. Continuing with this example, the injector needle 232 may have a different configuration where rotation of the injector body with respect the needle, or vice-versa, blocks and permits reductant flow into the reductant passage 218. Additionally, the cutting plane 250 for the cross-section illustrated in FIG. 3 is shown in FIG. 2.

FIG. 3 shows a cross-section of the reductant injector 38. The exhaust gas inlet 202 and reductant passage 218 are illustrated in FIG. 3. Additionally, the inner section 212, outer section 214, and connection sections 216 of the interior exhaust passage 211 are also shown in FIG. 2. As illustrated, the reductant passage 218, the inner section 212, and the outer section 214 are concentrically arranged with respect to one another. The concentric arrangement enables a large amount of heat to be transferred from the exhaust gas to the reductant during reductant injection thereby increasing reductant evaporation in the exhaust stream where the reductant is injected. Additionally, the connection sections 216 are also shown extending through the reductant passage 218.

FIG. 4 shows the reductant injector 38 in an open configuration. The actuator 234 may be commanded by the controller 100, shown in FIG. 1, to move the injector needle 232 to enable reductant to be flowed into the reductant passage 218 from upstream components (i.e., reductant conduit 36, reductant reservoir 32, shown in FIG. 1, etc.) Arrows 401 illustrate the flow of reductant from the reductant chamber 236 to the reductant passage 218.

In one example, the controller 100 may be configured to command the actuator 234 to open and close the reductant injector 38 based on catalyst oxidation state and exhaust temperature. For instance, when the exhaust temperature decreases or is below a threshold value the reductant injector may be opened to permit reductant injection. In another example, when the conversion rate in the catalyst is less than a threshold value the reductant injector may be opened. In this way, reductant may be selectively injected from the injector to increase $NO_x$ conversion in the catalyst. After the actuator 234 opens the reductant injector 38 reductant is flowed through the reductant passage 218 while exhaust gas is continuously flowed through various sections (i.e., inner section 212, outer section 214, and connection sections 216) of the interior exhaust passage 211 receiving exhaust gas from the exhaust gas inlet 202. Thus, separate exhaust and reductant streams are flowed adjacent to one another to increase the temperature of the reductant. It will be appreciated that the reductant traveling through the reductant passage 218 and the exhaust gas traveling through the interior exhaust passage 211 remain unmixed across the length of each respective passage during reductant injection operation, in the depicted example. However, in other examples mixing of the reductant and exhaust gas may occur in the reductant injector. Moreover, the reductant flow through the reductant passage 218 may be at a higher pressure than the exhaust gas flowing through the interior exhaust passage 211.

The inner nozzle 224, the outer nozzle 226, and the central nozzle 228 are also depicted in FIG. 4. The inner nozzle stream 400, outer nozzle stream 402, and central nozzle stream 404 are also generally shown in FIG. 4. Arrows 410 depict the flow mixing of the reductant in the central nozzle stream 404 and the exhaust gas in the inner and outer nozzle streams 400 and 402. As previously discussed, the flow mixing of the reductant and exhaust gas increases the $NO_x$ conversion in the downstream catalyst. It will be appreciated that the flow pattern of the reductant and exhaust gas may be far more complex than the flow pattern depicted in FIG. 4 and the flow pattern depicted in FIG. 4 is provided to aid in understanding of the general flow characteristics.

Additionally, it will be appreciated that reductant may be injected through the central nozzle 228 at a high pressure. When this high pressure reductant stream is injected adjacent to the exhaust stream, atomization of injected reductant is increased. Specifically, when the reductant is injected at a high pressure a vacuum is created at the tip of the reductant injector 38 which brings together neighboring exhaust gas with the reductant. This flow pattern is conducive to increasing reductant atomization. The axis 204 and central axis 206 are also shown in FIG. 4 for reference.

FIG. 5 shows a method 500 for operation of a reductant injector in an emission control system. The method 500 may be implemented via the reductant injector and emission control system discussed above with regard to FIGS. 1-4 or may be implemented by another suitable reductant injector and emission control system.

At 502 the method includes continuously flowing exhaust gas into an exhaust gas inlet in a reductant injector positioned in an exhaust conduit. Next at 504 the method includes flowing exhaust gas from the exhaust gas inlet to an interior exhaust passage in the reductant injector. At 506 the method includes flowing exhaust gas through an inner and outer nozzle into the exhaust conduit, the inner and outer nozzle receiving exhaust gas from the interior exhaust passage. Next at 508 the method includes determining operating parameters in the emission control system such as exhaust temperature, catalyst oxidation state, etc.

At 510 the method includes determining if SCR operation should be implemented based on the operating parameters determined at 508. If it is determined that SCR operation should not be implemented (NO at 510) the method returns to 508. However, if it is determined that SCR operation should be implemented (YES at 510) the method advances to 512. At 512 the method includes opening the reductant injector. In this way, the reductant injector may be opened at selected time intervals based on catalyst oxidation state and/or exhaust temperature, for instance. Opening the reductant injector may include steps 514-516. At 514 the method includes flowing reductant between sections of the interior exhaust passage while maintaining fluidic separation between the exhaust gas and reductant in the reductant injector. At 516 the method includes flowing reductant out of a central nozzle in the reductant injector. It will be appreciated that the central nozzle may be adjacent to the inner and outer nozzles having exhaust gas flowing therethrough. Specifically in one example, the central nozzle, inner nozzle, and outer nozzle may be concentrically arranged. Further in one example opening the reductant injector at 508 may include rotating the reductant injector to arrange the reductant injector in the open configuration. In this way, the arrangement of the exhaust gas inlet can be altered with respect to exhaust gas flow in the exhaust conduit to decrease backpressure in the exhaust system.

FIG. 6 shows another exemplary embodiment of the reductant injector 38 in exhaust conduit 40 extending through conduit wall 200. Thus, the reductant injector 38 may be included in the emission control system 30 shown in FIG. 1. It will be appreciated that the reductant injector shown in FIG. 6 includes several features that differentiate the injector from the reductant injector illustrated in FIGS. 2-4. However, the reductant injector shown in FIG. 6 also shares many common parts, components, features, etc., with the reducant injector shown in FIGS. 2-4. Therefore, the components are labelled accordingly and share similar functionality, geometric characteristics, etc. Specifically, in FIG. 6 the reductant injector 38 includes injector needle 232 and reductant chamber 236 configured to receive reductant from the reductant reservoir 32 shown in FIG. 1. The reductant injector 38 also includes actuator 234, mounting boss 230, interior exhaust passage 211 including inner section 212 and outer section 214 connected via connection sections 216, reductant passage 218, inner nozzle 224, outer nozzle 226, and central nozzle 228.

The inner nozzle stream 400, outer nozzle stream 402, and central nozzle stream 404 are also generally shown in FIG. 6. It will be appreciated that the aforementioned injection streams (i.e., reductant and exhaust gas streams) have greater flow mixing than the injection streams shown in FIG. 4. The improved flow mixing may be achieved by different features of the injector that generate increased exhaust gas turbulence of exhaust gas flowing therethrough, described in greater detail herein.

The reductant injector 38 depicted in FIG. 6 includes multiple exhaust gas inlets having different profiles than the single exhaust gas inlet 202 of the reductant injector depicted in FIGS. 2-4. Specifically, a first exhaust gas inlet 602 and a second exhaust gas inlet 604 are illustrated in FIG. 6. As shown in reductant injector cross-section in FIG. 7, the reductant injector 38 also includes a third exhaust gas inlet 606 and a fourth exhaust gas inlet 608, discussed in greater detail herein. However, reductant injectors with a different number of exhaust gas inlets have been contemplated. For instance, the reductant injector may only include a first and a second exhaust gas inlet or more than four exhaust gas inlets, in other examples. When the reductant injector includes a plurality of exhaust gas inlets manufacturing of the emission control system can be simplified. The manufacturing simplification is achieved due to the fact that multiple radial orientations of the reductant injector can provide desired injector inlet airflow characteristics. As such, the likelihood of improper reductant injector installation during manufacturing is resultantly reduced.

In one example, an orientation of the exhaust gas inlets 602, 604, 606, and 608, shown in FIGS. 6 and 7 relative to the exhaust conduit 40 remains fixed during actuation of the reductant injector to permit and inhibit reducant flow through the injector. In this way, operation of the reducant injector can be simplified when compared to other injector embodiments where the injector is rotated during actuation.

An outer housing 610 of the reductant injector 38 is also shown in FIG. 6. It will be appreciated that exhaust gas in the exhaust conduit 40 flows around an outer surface of the outer housing 610. The first exhaust gas inlet 602 and the second exhaust gas inlet 604 extend inwardly into the interior exhaust passage 211 from the outer housing 610. Therefore, the exhaust passage 211 receives exhaust gas from the first and second exhaust gas inlets 602 and 604. When the exhaust gas inlets extend inwardly into the interior exhaust gas passage from the outer housing 610 the profile of the reductant injector 38 can be reduced. A reduced reductant injector profile increases the compactness of the injector, enabling a reduction in exhaust gas backpressure in the exhaust system and the simplification of injector installation during manufacture of the emission control system.

The central axis 208 of the exhaust conduit 40 and the central axis 206 of the reductant injector 38 are also shown in FIG. 6 for reference. Additionally, cutting plane 620 defines the cross-section of the reductant injector 38 shown in FIG. 7 and cutting plane 622 defines the cross-section of the reductant stream and exhaust gas stream exiting the reductant injector in FIG. 8.

FIG. 7 shows a cross-sectional view of the reductant injector 38 shown in FIG. 6. The first exhaust gas inlet 602, the second exhaust gas inlet 604, the third exhaust gas inlet 606, and the fourth exhaust gas inlet 608 are depicted in FIG. 7. It will be appreciated that when the injector utilizes multiple exhaust gas inlets the turbulence of the exhaust gas can be further increased, thereby improving flow mixing of the reductant and exhaust gas exiting the reductant injector.

A first inlet wall 700, a second inlet wall 702, a third inlet wall 704, and a fourth inlet wall 706 are shown in FIG. 7. Each of the inlet walls has a similar geometry in the depicted example. As such, the following description of the first inlet wall also applies to the remaining inlet walls. However, inlet walls having different profiles, features, etc., have been contemplated. The first inlet wall 700 extends into the outer section 214 of the interior exhaust passage 211 from the outer housing surface 610. A boundary 710 of the first exhaust gas inlet 602 is partially delineated by the first inlet wall 700. Other portions of the boundary 710 of the first exhaust gas inlet 602 are delineated via dashed lines. However, different exhaust gas inlet shapes may be used. In the depicted example, the first inlet wall 700 does not extend past the outer housing surface 610 with regard to an outward radial direction. In this way, the profile of the injector can be reduced when compared to the injector shown in FIGS. 2-4 having the exhaust gas inlet protruding into the exhaust conduit.

In the depicted example, each of the first, second, third, and fourth exhaust gas inlets 602, 604, 606, and 608 continuously receive exhaust gas during combustion operation in the engine. However in other examples, valves (e.g., passive or active valves) may be provided in one or more of the exhaust gas inlets. The valves can enable the exhaust gas flow into the reductant injector to be modulated.

The first inlet wall 700 includes a downstream end 712 that is offset from the outer housing 610 with regard to a radial direction. Additionally, the first inlet wall 700 is curved in the illustrated example. The curvature of the first inlet wall 700 enables increased turbulence (e.g., swirl) to be generated in the exhaust gas flowing through the reductant injector, thereby improving flow mixing of reductant and exhaust gas exiting the reductant injector. Arrows 720 depict the general direction of exhaust gas flow from the exhaust gas inlets 602, 604, 606, and 608 into the interior exhaust gas passage 211.

As illustrated, the first exhaust gas inlet 602 is positioned on a radially opposing side of the outer housing surface 610 with regard to the first exhaust gas inlet 604. A radial axis showing the line dividing the sides of the surface is depicted in FIG. 7. As such, radially opposing sides may be defined as sides of the injector split by a radial axis extending through the center of the reductant injector. Positioning the exhaust gas inlets on radially opposing sides of the injector enables the reductant injector to be installed in the conduit wall 200, shown in FIG. 6, in multiple desired orientations. As a result, the likelihood of injector installation in an undesirable orientation is reduced. Furthermore, the third exhaust gas inlet 606 and the fourth exhaust gas inlet 608 are also positioned on radially opposing sides of the outer housing surface 610.

Sections 714 of the reductant passage 218 are also depicted in FIG. 7. Each of the reductant passage sections 714 includes a peripheral wall 716. In the depicted example, the peripheral walls 716 are tapered with regard to the axial cross-section shown in FIG. 7. Tapering the peripheral walls 716 promotes increase turbulence generation in exhaust gas flowing through the injector. Consequently, the amount of heat transferred from the exhaust gas to the reductant in the reductant injector can be increased. The connection sections 216 of the interior exhaust passage 211 fluidly connecting the inner section 212 and the outer section 214 of the interior exhaust passage. Arrows 722 depict the general direction of exhaust gas flow through the connection sections 216 into the inner section 212. The connection sections 216 are positioned between the reductant passage sections 714. In this way, exhaust gas can flow around the reductant passage 218 and into an interior section of the injector. It will be appreciated that the reductant passage sections 714 join upstream and downstream of the connection sections 216. Thus, the reductant passage may branch into different sections to accommodate exhaust gas flow into the center of the injector in a selected region.

FIG. 8 shows a cross-section of the different injection streams exiting the reductant injector 38, shown in FIG. 6. Specifically, the inner nozzle stream 400, outer nozzle stream 402, and central nozzle stream 404 are also generally illustrated in FIG. 8. It will be appreciated that in the FIG. 8 illustration the injection streams are simplified to aid in the understanding of the injector's flow characteristics and that in practice the reductant injector streams have greater complexity. Arrows 800 depict the mixing of the exhaust gas flow in the outer nozzle stream 402 and the reductant flow in the central nozzle stream 404. Likewise, arrows 802 depict the mixing of exhaust gas flow in the inner nozzle stream 400 and the reductant flow in the central nozzle stream 404. As described above, different injector features, such as the arrangement, profiles, etc., of the injector's exhaust gas inlets generate the improved flow mixing pattern illustrated in FIG. 8. Additionally, the tapered profile of sections of the reductant passage in the injector also generates the improved flow mixing pattern illustrated in FIG. 8.

FIGS. 1-4 and 6-7 show example configurations with relative positioning and sizing of the various components, although modifications may be made including changing the relative scaling and positioning of the components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 9 shows a method 900 for operation of a reductant injector in an emission control system. The method 900 may be implemented via the reductant injector and emission control system discussed above with regard to FIGS. 1-4 and 6-8 or may be implemented by another suitable reductant injector and emission control system.

At 902 the method includes flowing exhaust gas into a first exhaust gas inlet in a reductant injector from an exhaust conduit. In this step, a boundary of the first exhaust gas inlet may be at least partially delineated by an inlet wall extending into an interior exhaust passage from an outer housing surface, the interior exhaust passage adjacent to the reductant passage and receiving exhaust gas from the first exhaust gas inlet and fluidly separated from a reductant passage in the reductant injector. In one example, the exhaust gas may be continuously flowed into the first exhaust gas inlet from the exhaust conduit. However in other example, a valve may be position at the exhaust gas inlet to enable the amount of exhaust gas flowing through the reductant injector to be adjusted. In such an example, the valve at the exhaust gas inlet may be passively adjusted or may actively adjusted (e.g., opened, closed, etc.) by a controller, such as the controller 100 shown in FIG. 1.

Next at 904 the method includes flowing exhaust gas into a second exhaust gas inlet in the reductant injector from the exhaust conduit. In this step, the second exhaust gas inlet may be positioned on a radially opposing side of the outer housing surface of the reductant injector with regard to the first exhaust gas inlet.

At 906 the method includes flowing exhaust gas through the interior exhaust passage from the first exhaust gas inlet. The interior exhaust passage can include several sections as discussed above. For instance, the interior exhaust passage may include an outer section in fluidic communication with an inner section through a connection section. It will be appreciated that the first and second exhaust gas inlets open into the outer section. Thus, in one specific example exhaust gas can flow through the first and second exhaust gas inlet into the outer section, through the connection section and then the inner section.

At 908 the method includes flowing exhaust gas through an inner and outer nozzle into the exhaust conduit, the inner and outer nozzle receiving exhaust gas from the interior exhaust passage. In this way, exhaust gas can be flowed through different sections of the injector, enabling heat to be transferred to reductant flowing through the injector when the injector is injecting reductant. As a result, reductant vaporization in the exhaust system may be increased to improve catalyst operation.

At 910 the method includes determining operating parameters in the emission control system such as exhaust temperature, catalyst oxidation state, engine speed, exhaust gas composition, etc.

Next at 912 the method includes determining if SCR operation should be implemented based on the operating parameters determined at 910. For instance, it may be determined that SCR operation should be implemented when the catalyst is within a predetermined range and/or when one or more operating parameters indicate that nitrogen oxide emissions are above a threshold value. However it will be appreciated that a many different approaches may be used to determine if SCR operation should be implemented.

If it is determined that SCR operation should not be implemented (NO at 912) the method returns to 910. However, if it is determined that SCR operation should be implemented (YES at 912) the method advances to 914.

At 914 the method includes opening the reductant injector. Opening the reductant injector may include steps 916 and 918. Thus, in steps 916 and 918 the reductant injector may be in an open configuration. At 916 the method includes flowing reductant between sections of the interior exhaust passage while maintaining fluidic separation between the exhaust gas and reductant in the reductant injector. In one example, the reductant passage includes a plurality of reductant passage sections, each of the plurality of sections including a peripheral wall, and where exhaust gas flows through at least one connection section of the interior exhaust passage positioned between two of the reductant passage sections. The reductant passage sections may be positioned between the connection sections of the interior exhaust passage. Further in such an example, one or more of the peripheral walls may be tapered with regard to an axial cross-section. Tapering the walls of the reductant passage sections in this way, can further increase the turbulence of exhaust gas flowing around the reductant passage sections through the connection sections of the interior exhaust passage. At 918 the method includes flowing reductant out of a central nozzle in the reductant injector. Flowing reductant out of the central nozzle which has exhaust gas nozzle concentrically arranged inside and outside the central nozzle promotes flow mixing of the reductant and exhaust gas streams exiting the injector. Resultingly, nitrogen oxide conversion in the downstream catalyst can be increased when flow mixing is increased, thereby reducing emissions.

The subject matter of the present disclosure is further described in the following paragraphs. According to one aspect, an emission control system for an engine is provided. The emission control system includes a reductant injector extending into an exhaust conduit upstream of a catalyst, the reductant injector including a reductant passage receiving reductant from a reductant reservoir and a first exhaust gas inlet receiving exhaust gas from the exhaust conduit, a boundary of the first exhaust gas inlet at least partially delineated by an inlet wall extending into an interior exhaust passage from an outer housing surface, the interior exhaust passage adjacent to the reductant passage and receiving exhaust gas from the first exhaust gas inlet and fluidly separated from the reductant passage.

According to another aspect, a method for operation of a reductant injector in an emission control system is provided. The method includes flowing exhaust gas into a first exhaust gas inlet in a reductant injector from an exhaust conduit, a boundary of the first exhaust gas inlet at least partially delineated by an inlet wall extending into an interior exhaust passage from an outer housing surface, the interior exhaust passage adjacent to the reductant passage and receiving exhaust gas from the first exhaust gas inlet and fluidly separated from a reductant passage in the reductant injector and when the reductant injector is in an open configuration, flowing reductant through the reductant passage positioned between sections of the interior exhaust passage in the reductant injector while maintaining fluidic separation between the exhaust gas and reductant in the reductant injector.

According to another aspect a reductant injector is provided. The reductant injector includes a reductant passage selectively receiving reductant and a first exhaust gas inlet receiving exhaust gas from an exhaust conduit, a boundary of the first exhaust gas inlet delineated by an inlet wall extending into an interior exhaust passage from an outer housing surface, the interior exhaust passage adjacent to the reductant passage and receiving exhaust gas from the first exhaust gas inlet and fluidly separated from the reductant passage.

In any of the aspects described herein or combinations of the aspects, the inlet wall may not extend past the outer housing surface in an outward radial direction.

In any of the aspects described herein or combinations of the aspects, a downstream end of the inlet wall may be offset from the outer housing surface of the reductant injector with regard to a radial direction.

In any of the aspects described herein or combinations of the aspects, the reductant injector may further include a second exhaust gas inlet positioned on a radially opposing side of the outer housing surface with regard to the first exhaust gas inlet.

In any of the aspects described herein or combinations of the aspects, an orientation of the first exhaust gas inlet relative to the exhaust conduit may remain fixed during actuation of the reductant injector to permit and inhibit reductant flow through the reductant injector.

In any of the aspects described herein or combinations of the aspects, the inlet wall may be curved.

In any of the aspects described herein or combinations of the aspects, the reductant passage can include a peripheral wall separating reductant from the exhaust gas flowing through the interior exhaust passage.

In any of the aspects described herein or combinations of the aspects, the peripheral wall may be tapered with regard to an axial cross-section.

In any of the aspects described herein or combinations of the aspects, the exhaust gas may continuously flow through the interior exhaust passage during combustion operation in the engine.

In any of the aspects described herein or combinations of the aspects, the method may further include flowing exhaust gas into a second exhaust gas inlet in the reductant injector from the exhaust conduit, the second exhaust gas inlet positioned on a radially opposing side of the outer housing surface of the reductant injector with regard to the first exhaust gas inlet.

In any of the aspects described herein or combinations of the aspects, the reductant passage may include a plurality of reductant passage sections, each of the plurality of sections including a peripheral wall, and where exhaust gas flows through at least one connection section of the interior exhaust passage positioned between two of the reductant passage sections.

In any of the aspects described herein or combinations of the aspects, one or more of the peripheral walls may be tapered with regard to an axial cross-section.

In any of the aspects described herein or combinations of the aspects, the exhaust gas can be continuously flowed into the reductant injector during combustion operation in the engine.

In any of the aspects described herein or combinations of the aspects, the inlet wall may not extend past the outer housing surface in an outward radial direction.

In any of the aspects described herein or combinations of the aspects, the reductant injector may further include a second exhaust gas inlet positioned on a circumferentially opposing side of the outer housing surface with regard to the first exhaust gas inlet, the outer housing surface having exhaust gas flowing therearound.

In any of the aspects described herein or combinations of the aspects, the inlet wall may be curved.

In any of the aspects described herein or combinations of the aspects, the reductant passage may include a peripheral wall separating reductant from the exhaust gas flowing through the interior exhaust passage, the peripheral wall being tapered with regard to an axial cross-section.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An emission control system for an engine comprising:
    a reductant injector extending into an exhaust conduit upstream of a catalyst, the reductant injector including:
        a reductant passage receiving reductant from a reductant reservoir; and
        a first exhaust gas inlet receiving exhaust gas from the exhaust conduit, a boundary of the first exhaust gas inlet at least partially delineated by an inlet wall extending into an interior exhaust passage from an outer housing surface, the interior exhaust passage adjacent to the reductant passage and receiving exhaust gas from the first exhaust gas inlet and fluidly separated from the reductant passage.

2. The emission control system of claim 1, where the inlet wall does not extend past the outer housing surface in an outward radial direction.

3. The emission control system of claim 1, where a downstream end of the inlet wall is offset from the outer housing surface of the reductant injector with regard to a radial direction.

4. The emission control system of claim 1, where the reductant injector further includes a second exhaust gas inlet positioned on a radially opposing side of the outer housing surface with regard to the first exhaust gas inlet.

5. The emission control system of claim 1, where an orientation of the first exhaust gas inlet relative to the exhaust conduit remains fixed during actuation of the reductant injector to permit and inhibit reductant flow through the reductant injector.

6. The emission control system of claim 1, where the inlet wall is curved.

7. The emission control system of claim 1, where the reductant passage includes a peripheral wall separating the reductant from the exhaust gas flowing through the interior exhaust passage.

8. The emission control system of claim 7, where the peripheral wall is tapered with regard to an axial cross-section.

9. The emission control system of claim 1, where the exhaust gas continuously flows through the interior exhaust passage during combustion operation in the engine.

10. A method for operation of a reductant injector in an emission control system, comprising:
flowing exhaust gas into a first exhaust gas inlet in a reductant injector from an exhaust conduit, a boundary of the first exhaust gas inlet at least partially delineated by an inlet wall extending into an interior exhaust passage from an outer housing surface, the interior exhaust passage adjacent to a reductant passage and receiving exhaust gas from the first exhaust gas inlet and fluidly separated from the reductant passage in the reductant injector; and
when the reductant injector is in an open configuration, flowing reductant through the reductant passage positioned between sections of the interior exhaust passage in the reductant injector while maintaining fluidic separation between the exhaust gas and reductant in the reductant injector.

11. The method of claim 10, flowing exhaust gas into a second exhaust gas inlet in the reductant injector from the exhaust conduit, the second exhaust gas inlet positioned on a radially opposing side of the outer housing surface of the reductant injector with regard to the first exhaust gas inlet.

12. The method of claim 10, where the reductant passage includes a plurality of reductant passage sections, each of the plurality of reductant passage sections including a peripheral wall, and where exhaust gas flows through at least one connection section of the interior exhaust passage positioned between two of the reductant passage sections.

13. The method of claim 10, where one or more of the peripheral walls is tapered with regard to an axial cross-section.

14. The method of claim 10, where the exhaust gas is continuously flowed into the reductant injector during combustion operation in an engine.

15. A reductant injector comprising:
a reductant passage selectively receiving reductant; and
a first exhaust gas inlet receiving exhaust gas from an exhaust conduit, a boundary of the first exhaust gas inlet delineated by an inlet wall extending into an interior exhaust passage from an outer housing surface, the interior exhaust passage adjacent to the reductant passage, receiving exhaust gas from the first exhaust gas inlet, and fluidly separated from the reductant passage;
where the inlet wall includes a downstream end inwardly offset from the outer housing surface.

16. The reductant injector of claim 15, where the inlet wall does not extend past the outer housing surface in an outward radial direction.

17. The reductant injector of claim 15, where the downstream end of the inlet wall is offset from the outer housing surface of the reductant injector with regard to a radial direction.

18. The reductant injector of claim 15, further comprising a second exhaust gas inlet positioned on a circumferentially opposing side of the outer housing surface with regard to the first exhaust gas inlet, the outer housing surface having exhaust gas flowing therearound.

19. The reductant injector of claim 15, where the inlet wall is curved.

20. The reductant injector of claim 15, where the reductant passage includes a peripheral wall separating the reductant from the exhaust gas flowing through the interior exhaust passage, the peripheral wall being tapered with regard to an axial cross-section.

* * * * *